United States Patent
Homorodi et al.

(10) Patent No.: US 10,390,229 B1
(45) Date of Patent: Aug. 20, 2019

(54) BIOMETRIC SUBSCRIBER ACCOUNT AUTHENTICATION

(71) Applicant: T-Mobile USA, Inc., Bellevue, WA (US)

(72) Inventors: Zoltan Homorodi, Snoqualmie, WA (US); James Alexander Latham, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/237,445

(22) Filed: Dec. 31, 2018

(51) Int. Cl.
| | |
|---|---|
| *H04W 12/06* | (2009.01) |
| *H04W 12/08* | (2009.01) |
| *H04W 12/04* | (2009.01) |
| *H04W 8/18* | (2009.01) |
| *H04W 12/00* | (2009.01) |
| *G06F 21/60* | (2013.01) |
| *H04L 29/06* | (2006.01) |
| *G06F 21/32* | (2013.01) |

(52) U.S. Cl.
CPC ............ *H04W 12/08* (2013.01); *G06F 21/32* (2013.01); *G06F 21/604* (2013.01); *H04L 63/083* (2013.01); *H04L 63/102* (2013.01); *H04W 8/18* (2013.01); *H04W 12/00514* (2019.01); *H04W 12/0401* (2019.01); *H04W 12/06* (2013.01)

(58) Field of Classification Search
CPC .... H04W 4/80; H04W 12/06; H04L 63/0861; H04L 63/083
USPC .......................... 455/410, 411; 713/138, 184
See application file for complete search history.

(56) References Cited

U.S. PATENT DOCUMENTS

2003/0204734 A1* 10/2003 Wheeler ............... H04L 9/0844
713/184
2017/0346850 A1* 11/2017 Jin ........................ H04W 76/27

* cited by examiner

*Primary Examiner* — Sam Bhattacharya
(74) *Attorney, Agent, or Firm* — Lee & Hayes, P.C.

(57) ABSTRACT

Systems and methods for biometric subscriber account authentication are described. When a subscriber initially accesses subscriber account data maintained by the communication network, a first non-biometric authentication protocol is used. The subscriber may then be invited to set up biometric authentication, which includes generating a private key/public key pair. Subsequently, biometric authentication is performed at the user device to unlock the private key/public key pair, which is then used to support authentication of the subscriber to the communication network using a second authentication protocol.

18 Claims, 5 Drawing Sheets

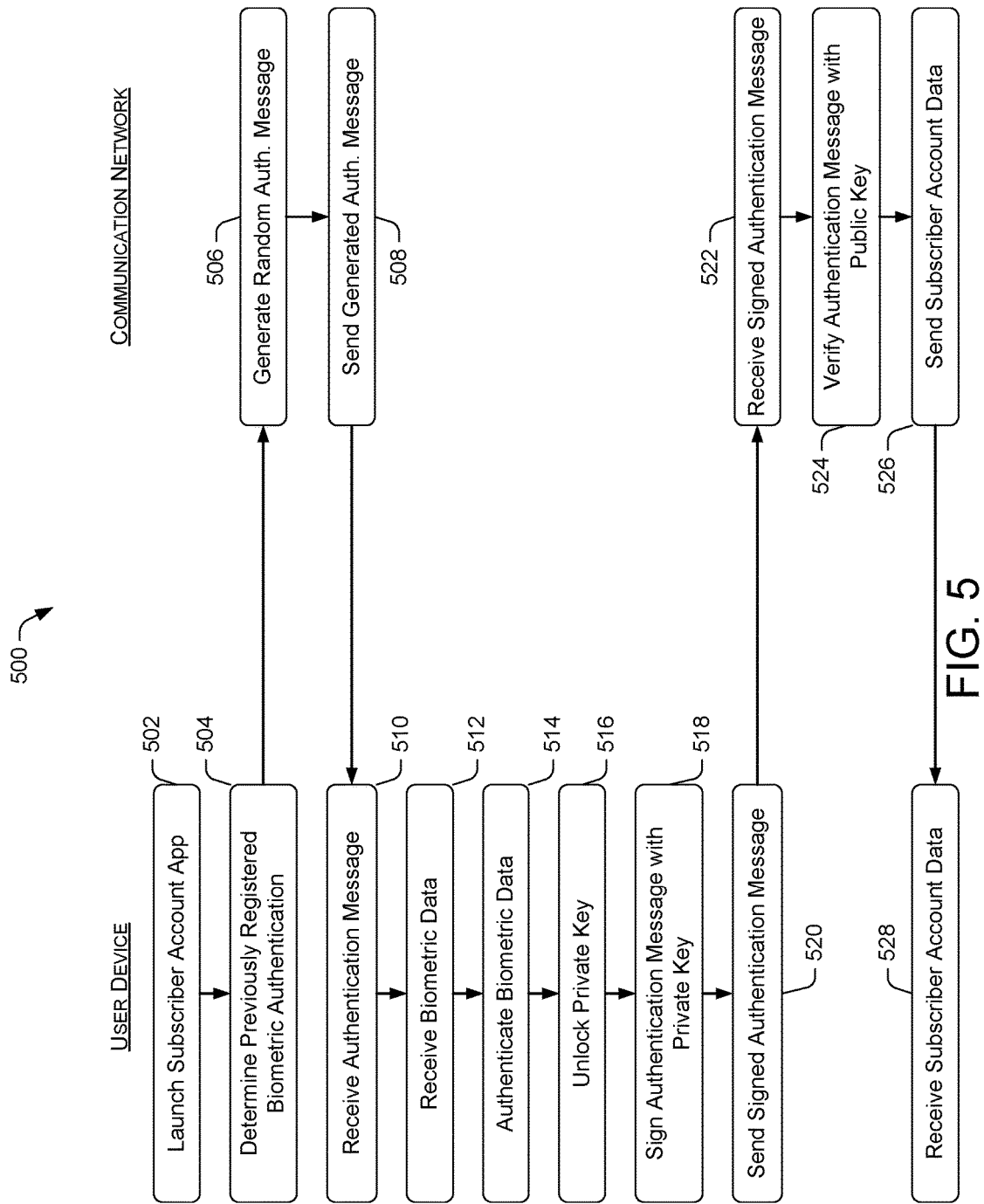

BIOMETRIC SUBSCRIBER ACCOUNT AUTHENTICATION

BACKGROUND

Most mobile phones are associated with a subscription on a communication network. Subscriber account information (e.g., billing data, user preferences, usage information, etc.) is stored on the communication network, and protected by a username and password unique to the subscriber. By entering the username and password, a subscriber can access the subscriber account information through an application on the mobile phone that communicates with the communication network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 is a flow diagram of an example process for accessing subscriber account data using biometric subscriber account authentication.

DETAILED DESCRIPTION

Introduction

Systems and methods discussed herein are directed to biometric subscriber account authentication.

In the described example implementations, biometric authentication on a user device enables access to subscriber account information on the communication network. When a user first accesses subscriber account information on the communication network, a username and password (or other type of credentials) are required. In response to the first login, the user has the option to enable biometric authentication for subsequent logins. If the user chooses to enable biometric authentication, a private key/public key pair is generated to support future biometric authentication.

After biometric authentication is enabled, biometric authentication is performed on the user device, and is used to unlock the previously generated private key/public key pair. The public key is stored in association with the subscriber account information on the communication network, and the private key is used to sign an authentication message. When the signed authentication message is verified using the public key, access to the subscriber account information on the communication network is granted.

The registered public key (i.e. registered biometric data) is associated with the user's individual account. This may be independent of MSISDN(s), account parameters and account roles. The unique identification of the user on the network is a very strong attestation of identity and provides strong protection against fraudulent activity on the account and strong non-repudiation of a transaction that was authenticated with a biometric.

Example Network Environment

Figure 1:
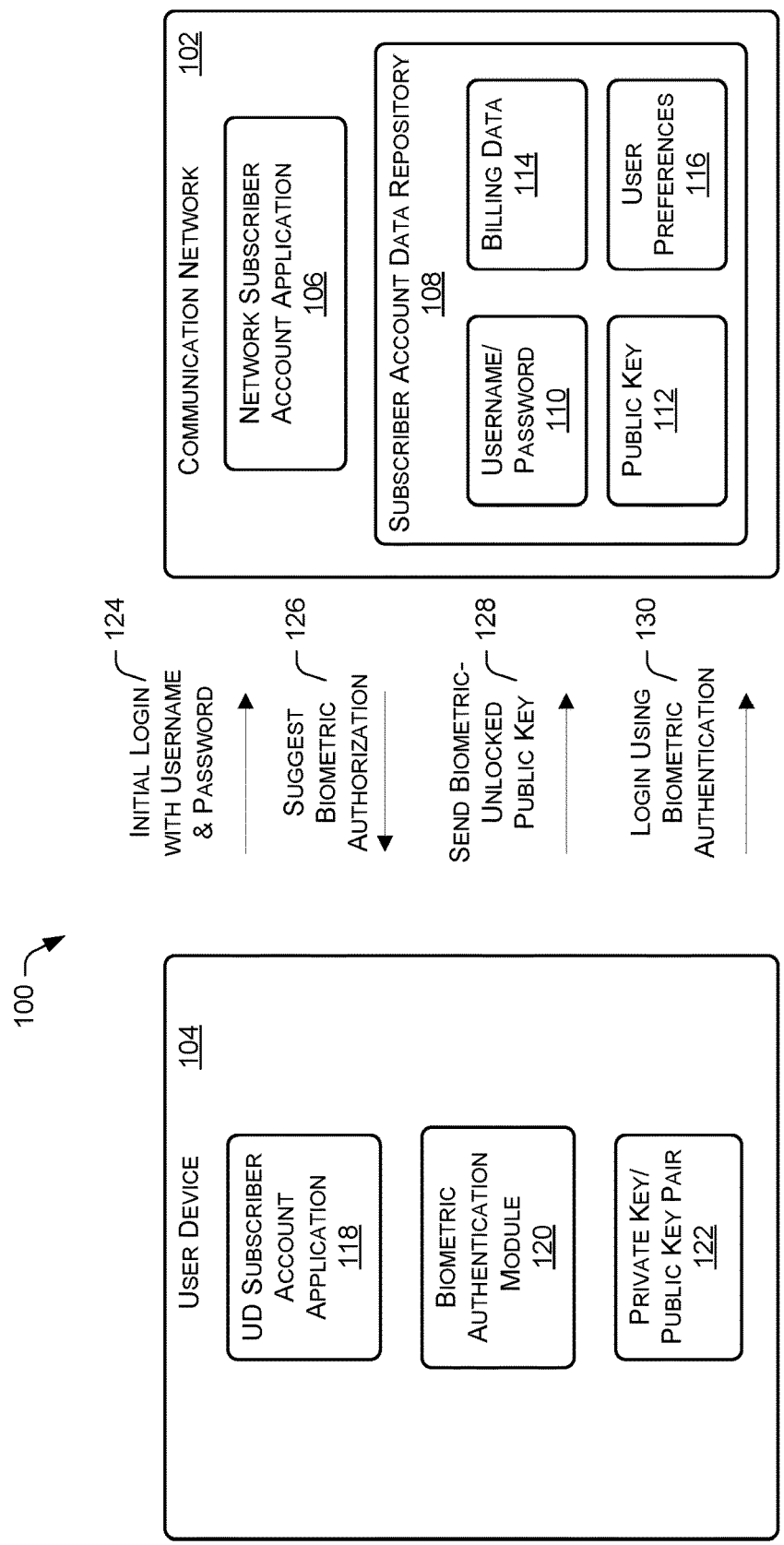
FIG. 1 is a block diagram illustrating an example communication exchange between a user device and a communication network to enable biometric subscriber account authentication.

FIG. 1 illustrates an example network environment 100 in which biometric subscriber account authentication can be implemented. Example network environment 100 includes communication network 102 and user device 104. Communication network 102 includes network subscriber account application 106 and subscriber account data repository 108. Subscriber account data repository 108 includes, for each subscriber, a username and password 110 and a public key 112. Subscriber account data repository 108 may also maintain any other data specific to a subscriber account, including, for example, billing data 114 and user preferences 116. Network subscriber account application 106 enables user access to data maintained in the subscriber account data repository 108.

User device 104 includes UD (user device) subscriber account application 118, biometric authentication module 120, and private key/public key pair 122. Public key 112, stored in the subscriber account data repository 108 corresponds to the public key portion of the private key/public key pair 122. UD subscriber account application 118 runs on the user device 104 and communicates with network subscriber account application 106 on the communication network 102 to provide a user access to data maintained in the subscriber account data repository 108.

Communications 124-130 illustrate an example process for enabling biometric authentication to the network subscriber account application 106. At 124, a user launches UD subscriber account application 118 on the user device 104, and enters a username and password. The username and password are transmitted 124 to the network subscriber account application 106 on the communication network 102.

Network subscriber account application 106 compares the received username and password to the username/password 110 stored in the subscriber account data repository. If the received username and password match the username/password 110, the user is authenticated and has access to his or her subscriber data through the network subscriber account application 106 via the UD subscriber account application 118.

After the user is authenticated using the username and password, at 126 network subscriber account application 106 sends to UD subscriber account application 118 a suggestion to use biometric authentication. If the user chooses to use biometric authentication, then UD subscriber account application 118 calls biometric authentication module 120 to perform a biometric authentication of the user on the user device 104. Biometric authentication may include, for example, a fingerprint scan, a retina scan, facial recognition, or any other type of biometric authentication.

When the biometric authentication module 120 authenticates the user's biometric data, the biometric authentication module 120 generates and stores a private key/public key pair 122. At 128, the UD subscriber account application 118 sends the public key that was generated by the biometric authentication module 120 to the network subscriber account application 106. The public key is stored as public key 112 in association with the user's subscriber account.

At a later time, when the user launches UD subscriber account application 118, the user is prompted for biometric data for authentication. When the biometric data is authenticated, the private key is unlocked and the user is logged into the network subscriber account application 106 using the private key/public key pair 122, based on the biometric authentication 130 rather than using the username and password.

In an example implementation, they private key/public key pair 122 is implemented as a pair of asymmetric cryptography keys. The key pair may be implemented according to a standard such as the Public-Key Cryptography Standards, an example of which is PKCS: RSA Cryptography.

Example User Device

Figure 2:
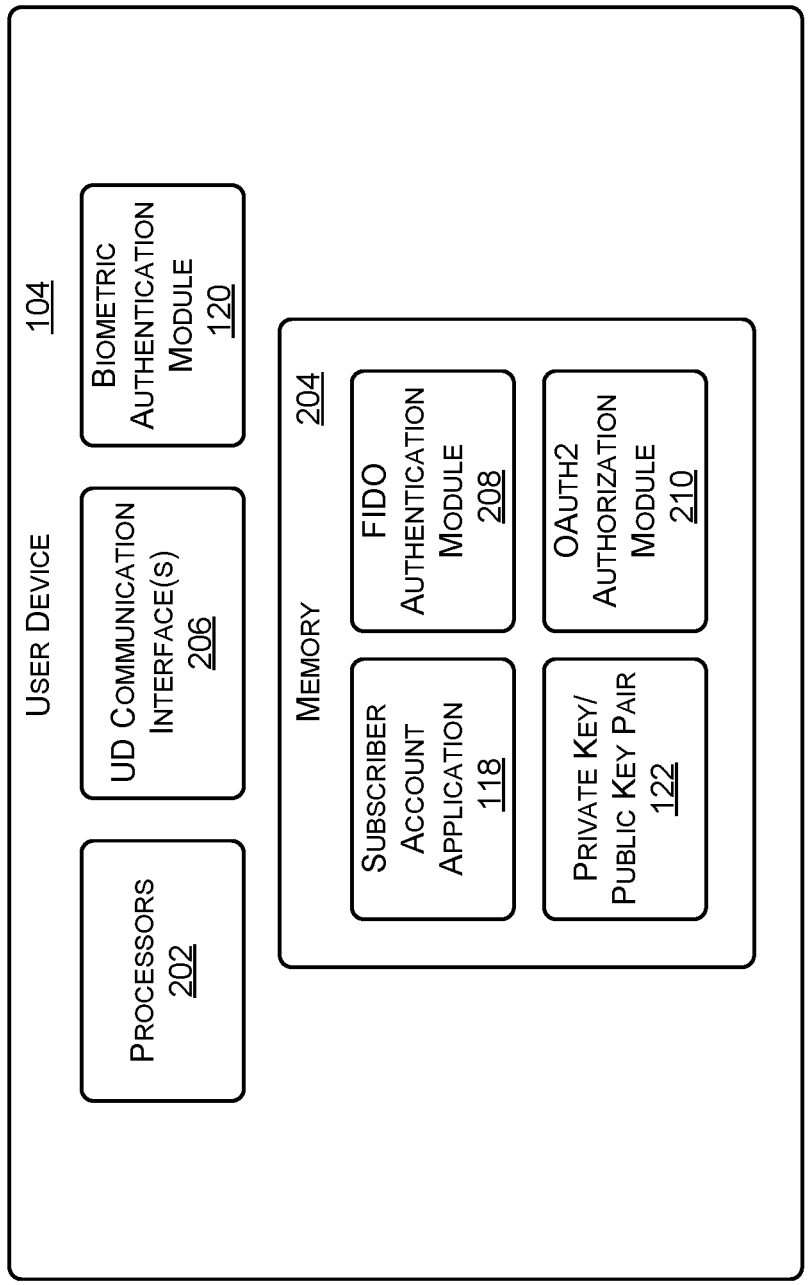
FIG. 2 is a block diagram of select components of an example user device configured to support biometric subscriber account authentication.

FIG. 2 illustrates select components of an example user device 104. Example user device 104 includes one or more processors 202, memory 204 communicatively coupled to the one or more processors 202, and one or more UD (user device) communication interface(s) 206. Memory 204 may include, for example, UD subscriber account application 118, private key/public key pair 122, fast identity online (FIDO) authentication module 208, OAuth2 authorization module 210, and any number of other applications (not shown).

UD communication interfaces 206 may include, for example, a session initiation protocol (SIP) interface that enables user device 104 to communicate with the communication network 102 via SIP and a Ut interface that enables user device 104 to communicate with the communication network 102 via XCAP (XML configuration access protocol).

UD subscriber account application 118 is executed by the processor 202 and communicates with the communication network 102 to provide the user with access to various account information including, for example, billing information, subscription and service information, user preferences, and so on.

FIDO authentication module 208 is configured to manage FIDO authentication. For example, FIDO authentication module 208 may be used to store, find, and fetch registered private key/public key pairs, and exchange, sign, and verify authentication messages, using the private key/public key pair 122, between UD subscriber account application 118 and network subscriber account application 106.

OAuth2 authorization module 210 is configured to manage authentication and authorization for a user to access UD subscriber account application 118 according to the OAuth2 protocol (e.g., using a username and password).

Private key/public key pair 122 may be unlocked by biometric authentication module 120, and used by UD subscriber account application 118 to support biometric authentication to the UD subscriber account application 118. The private key is maintained on the user device, and is used to sign a received authentication message. The public key is stored on the communication network and used to verify the authentication message that was signed with the private key.

Example Communication Network

Figure 3:
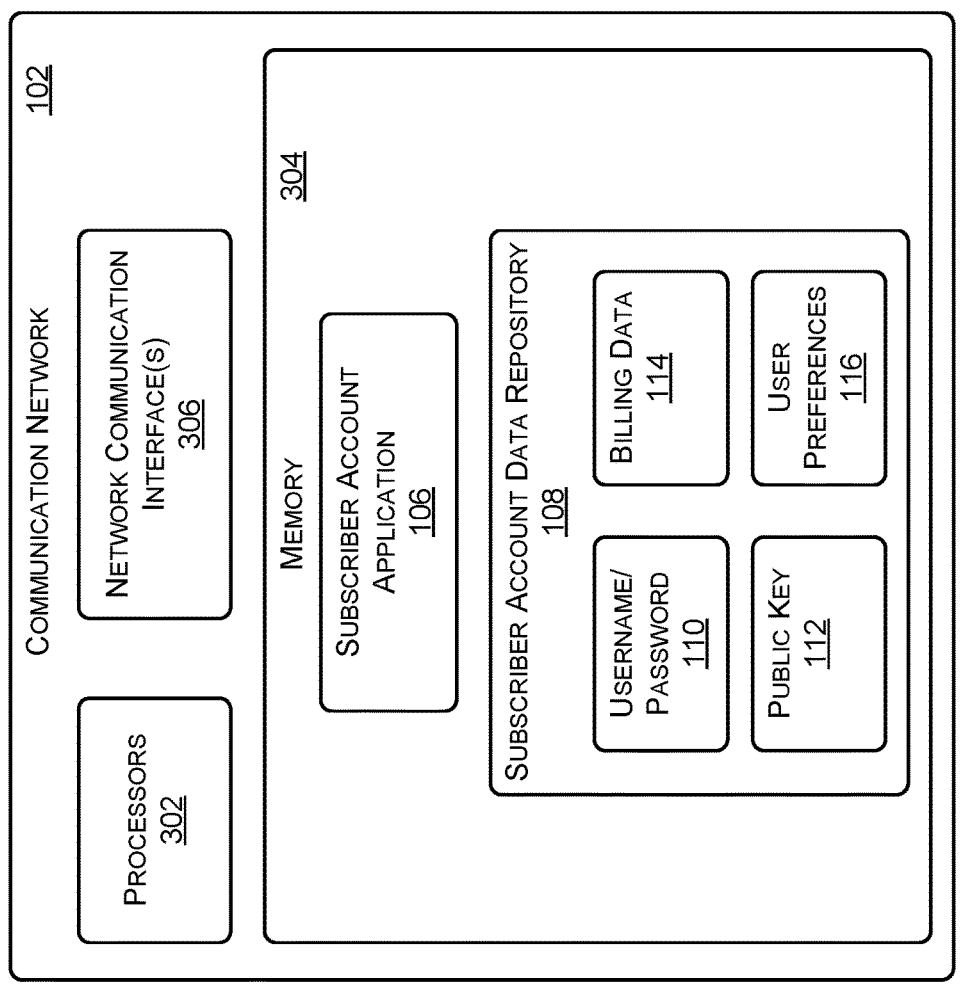
FIG. 3 is a block diagram of select components of an example communication network configured to support biometric subscriber account authentication.

FIG. 3 illustrates select components of an example communication network 102. Example communication network 102 includes one or more processors 302, memory 304 communicatively coupled to the one or more processors 302, and one or more network communication interface(s) 306. Memory 304 may include, for example, network subscriber account application 106 and subscriber account data repository 108.

Network subscriber account application 106 is configured to access data maintained in the subscriber account data repository 108 and to communicate with UD subscriber account application 118 on a user device 104. For example, when a user submits a request through the UD subscriber account application 118 to view billing data associated with his or her account, the UD subscriber account application 118 communicates the request to the network subscriber account application 106 on the communication network 102. The network subscriber account application 106 may retrieve the requested billing data from the subscriber account data repository 108 and provide the requested billing data to the UD subscriber account application 118 on the user device 104.

Subscriber account data repository 108 maintains data associated with user accounts on the communication network 102. For individual user accounts, subscriber account data repository 108 may maintain, for example, a user name and password 110, billing data 114, and user preferences 116. In addition, in association with user accounts for which biometric authentication has been established, subscriber account data repository 108 may also maintain a public key 112 associated with the user account.

Example Processes

Figure 4:
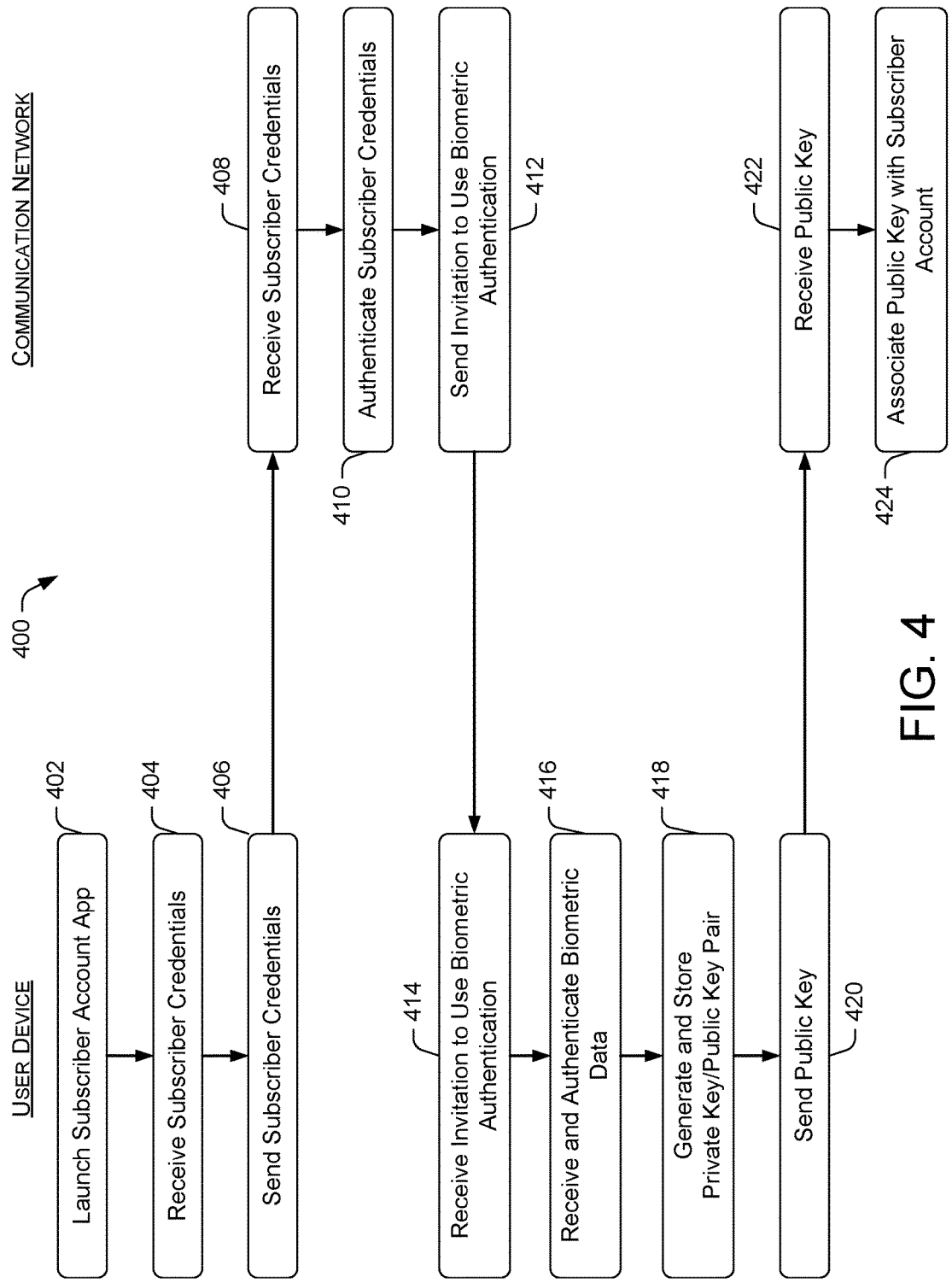
FIG. 4 is a flow diagram of an example process for establishing biometric subscriber account authentication.

FIG. 4 is a flow chart of an example process 400 for registering biometric authentication for a subscriber account.

At block 402, a subscriber account application is launched on a user device. For example, a user selects the UD subscriber account application 118 from a home screen of the user device 104, causing the processor 202 to execute the UD subscriber account application 118.

At block 404, the subscriber account application on the user device receives subscriber credentials. For example, a subscriber enters a username and password through a user interface on the user device 104 associated with the UD subscriber account application 118.

At block 406, the subscriber credentials are sent to the communication network. For example, the username and password are transmitted from the UD subscriber account application 118 on the user device 104 to the network subscriber account application 106 on the communication network 102 within an authentication standard, such as OAuth2.

At block 408, the communication network receives the subscriber credentials. For example, network communication interface 306 receives the username and password from the user device 104.

At block 410, the communication network authenticates the subscriber credentials. For example, network subscriber account application 106 compares the received username and password to a username and password 110 stored in the subscriber account data repository 108.

At block 412, the communication network sends an invitation to the client device for the subscriber to use biometric authentication. For example, the network subscriber account application 106 on the communication network 102 determines, based on data in the subscriber account data repository 108, that the subscriber account is not currently set up to use biometric authentication. Based on that determination, the network subscriber account application 106 sends a notification to the UD subscriber account application 118 on the user device 104, inviting the user to setup biometric authentication for future access to the subscriber account data through the UD subscriber account application 118 and the network subscriber account application 106.

At block 414, the user device receives the invitation to use biometric authentication. For example, the UD subscriber account application 118 on the user device 104 receives the notification sent from the communication network 102 and presents the user with an opportunity to setup biometric authentication.

At block 416, the user device receives and authenticates biometric data. For example, the biometric authentication module 120 receives a fingerprint, a facial image, or some other form of biometric data. Biometric authentication module 120 authenticates the received biometric data based on previously received biometric data associated with the user.

At block 418, based on the received biometric data, a private key/public key pair is generated and stored. This may also be referred to as registering a biometric or registering biometric data. For example, in response to determining that the biometric data is associated with the user, biometric authentication module 120 generates and stores the private key/public key pair 122, making the private key/public key pair 122 available to the UD subscriber account application 118.

At block 420, the user device sends the public key to the communication network. For example, UD subscriber account application 118 causes the public key to be transmitted through UD communication interface 206 to the communication network 102.

At block 422, the communication network receives the public key from the user device. For example, network subscriber account application 106 receives the public key through the network communication interface 306.

At block 424, the communication network associates the public key with the subscriber account. For example, network subscriber account application 106 stores the received public key in the subscriber account data repository 108 in association with the user's account as public key 112. In an example implementation, associating the public key with the subscriber account also includes notifying the subscriber that the biometric information has been registered for their account. This notification may be performed, for example, via email.

FIG. 5 is a flow chart of an example process 500 for authenticating a subscriber account using biometric data.

At block 502, a subscriber account application is launched on a user device. For example, a user selects the UD subscriber account application 118 from a home screen of the user device 104, causing the processor 202 to execute the UD subscriber account application 118.

At block 504, the UD subscriber account application 118 determines that biometric authentication has been previously registered.

At block 506, based on the determination that biometric authentication has been previously registered, the communication network generates a random authentication message. For example, the network subscriber account application 106 on the communication network 102 generates a random message to facilitate subscriber authentication via FIDO.

At block 508 the communication network sends the generated authentication message to the user device. For example, the network subscriber account application 106 on the communication network 102 transmits the generated authentication message via a network communication interface 306.

At block 510, the user device receives the authentication message. For example, UD subscriber account application 118 receives the authentication message through a UD communication interface 206.

At block 512, the user device receives biometric data. For example, UD subscriber account application 118 calls the biometric authentication module 120 on the user device 104, which presents a message requesting a user to submit biometric data. The user then provides a fingerprint, facial image, or other biometric data supported by the biometric authentication module 120 of the user device 104.

At block 514, the biometric data is authenticated. For example, the biometric authentication module 120 of the user device 104 verifies that the received biometric data is associated with the user.

At block 516, in response to the biometric data being authenticated, the private key is unlocked. For example, the biometric authentication module 120 unlocks the private key/public key pair 122 for use by the UD subscriber account application 118.

At block 518, the authentication message is signed using the private key. For example, UD subscriber account application 118 uses the private key of the private key/public key pair 122 to sign the authentication message that was received at block 508, creating a signed authentication message.

At block 520, the user device sends the signed authentication message to the communication network. For example, UD subscriber account application 118 transmits the signed authentication message via a UD communication interface 206.

At block 522, the communication network receives the signed authentication message. For example, network subscriber account application 106 receives the signed authentication message via a network communication interface 306 of the communication network 102.

At block 524, the communication network verifies the authentication message using the public key. For example, network subscriber account application 106 uses the public key 112 to process the received signed authentication message, to verify that the received message matches the authentication message that was sent at block 506.

At block 526, the communication network sends subscriber account data to the user device. For example, billing data 114, user preferences 116, or other subscriber account data that is maintained in subscriber account data repository 108 in association with the particular user account is transmitted via a network communication interface 306 to the user device 104.

At block 528, the user device receives the subscriber account data. For example, UD subscriber account application 118 receives the subscriber account data via a UD communication interface 206. The subscriber account data may then be presented via a user interface to the user. The user interface may enable a user to view and/or modify all or a portion of the subscriber account data.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 204 and memory 304 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 4 and 5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at a communication network, the method comprising:
   receiving a request from a user device to access subscriber account data, the request including subscriber credentials;
   authenticating the subscriber credentials;
   transmitting an invitation to use biometric authentication to access the subscriber account data;
   in response to transmitting the invitation, receiving a public key to be associated with the subscriber account data;
   receiving, at the communication network, a subsequent request from the user device to access the subscriber account data;
   determining that the public key is associated with the subscriber account data;
   generating an authorization message;
   transmitting the authorization message to the user device;
   receiving a signed authorization message from the user device;
   using the public key to verify the signed authorization message; and
   in response to verifying the signed authorization message, granting access to the subscriber account data according to the subsequent request.

2. A method as recited in claim 1, wherein the subscriber credentials comprise a username and a password.

3. A method as recited in claim 1, wherein the request to access subscriber account data is received according to an authentication protocol.

4. A method as recited in claim 1, wherein the subsequent request to access the subscriber account data is received according to a fast identity online (FIDO) standard authentication protocol.

5. A method as recited in claim 1, wherein:
   the request to access subscriber account data is received according to a first authentication protocol; and
   the subsequent request to access the subscriber account data is received according to a second authentication protocol.

6. A method as recited in claim 1, wherein:
   the request to access subscriber account data is authenticated based on a username and password; and
   the subsequent request to access the subscriber account data is authenticated based on biometric data.

7. A method implemented at a mobile communication device, the method comprising:
   executing a subscriber account application on the mobile communication device;
   requesting subscriber credentials;
   receiving the subscriber credentials;
   transmitting, to a communication network that maintains subscriber account data, a request to access the subscriber account data, the request including the subscriber credentials;
   receiving, from the communication network, an invitation to use biometric authentication;
   presenting the invitation to use biometric authentication;
   receiving biometric data;
   authenticating the biometric data;
   in response to authenticating the biometric data, unlocking a private key/public key pair; and
   transmitting a public key of the private key/public key pair to the communication network.

8. A method as recited in claim 7, wherein the subscriber credentials comprise a username and a password.

9. A method as recited in claim 7, wherein the biometric data comprises at least one of:
   a fingerprint;
   a retina scan; or
   an image of a user's face.

10. A method as recited in claim 7, further comprising:
    transmitting to the communication network, a subsequent request to access the subscriber account data;
    receiving, from the communication network, an authentication message;
    receiving and authenticating additional biometric data;
    in response to receiving and authenticating the additional biometric data, signing the authentication message with a private key of the private key/public key pair to generate a signed authentication message;
    transmitting to the communication network, the signed authentication message; and receiving an indication that access to the subscriber account data has been granted.

11. A method as recited in claim 10, wherein:
the request to access the subscriber account data is transmitted according to a first authentication protocol; and
the subsequent request to access the subscriber account data is transmitted according to a second authentication protocol.

12. One or more non-transitory computer storage media comprising instructions that, when executed by a processor, configure a computing system to perform operations comprising:
receiving a request from a user device to access subscriber account data;
authenticating subscriber credentials associated with the request;
in response to authenticating the subscriber credentials, granting access to the subscriber account data according to the request;
receiving a public key to be associated with the subscriber account data;
receiving from the user device, a subsequent request to access the subscriber account data;
in response to receiving the subsequent request, generating an authorization message;
transmitting the authorization message to the user device;
receiving a signed authorization message from the user device;
using the public key to verify the signed authorization message; and
in response to verifying the signed authorization message, granting access to the subscriber account data according to the subsequent request.

13. One or more non-transitory computer storage media as recited in claim 12, wherein the subscriber credentials comprise a username and a password.

14. One or more non-transitory computer storage media as recited in claim 12, wherein:
the request to access subscriber account data is received according to a first authentication protocol; and
the subsequent request to access the subscriber account data is received according to a second authentication protocol.

15. One or more non-transitory computer storage media as recited in claim 12, wherein the first authentication protocol is based on an OAuth2 standard.

16. One or more non-transitory computer storage media as recited in claim 12, wherein the second authentication protocol is based on a FIDO standard.

17. One or more non-transitory computer storage media as recited in claim 12, wherein:
the request to access subscriber account data is authenticated based on a username and password; and
the subsequent request to access the subscriber account data is authenticated based on biometric data.

18. One or more non-transitory computer-storage media as recited in claim 17, wherein the biometric data comprises at least one of:
a fingerprint;
a retina scan; or
an image of a subscriber's face.

* * * * *